United States Patent
Wang (10) Patent No.: US 12,101,406 B2
(45) Date of Patent: Sep. 24, 2024

(54) SERVICE MANAGEMENT SYSTEM, TOKEN ISSUING SERVER, AND METHOD FOR TOKEN ISSUING SERVER

(71) Applicant: TOSHIBA TEC KABUSHIKI KAISHA, Tokyo (JP)

(72) Inventor: Xiaozhou Wang, Tagata Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 182 days.

(21) Appl. No.: 17/845,376

(22) Filed: Jun. 21, 2022

(65) Prior Publication Data

US 2023/0188348 A1 Jun. 15, 2023

(30) Foreign Application Priority Data

Dec. 15, 2021 (JP) ................................ 2021-203285

(51) Int. Cl.
*H04L 9/32* (2006.01)
*G06F 9/54* (2006.01)
*H04L 9/40* (2022.01)

(52) U.S. Cl.
CPC ............ *H04L 9/3213* (2013.01); *G06F 9/547* (2013.01); *H04L 63/10* (2013.01)

(58) Field of Classification Search
CPC ........ H04L 9/3213; H04L 63/10; G06F 9/547
See application file for complete search history.

(56) References Cited

U.S. PATENT DOCUMENTS

| 8,132,242 | B1 | 3/2012 | Wu |
| 9,183,376 | B2 | 11/2015 | Shinoda |
| 11,503,031 | B1* | 11/2022 | Hu ...................... H04L 67/1097 |
| 2015/0281225 | A1* | 10/2015 | Schoen .................. H04L 63/08 726/9 |
| 2016/0065563 | A1 | 3/2016 | Broadbent |
| 2019/0103968 | A1* | 4/2019 | Srinivasan ............ H04L 9/0894 |

OTHER PUBLICATIONS

Extended European Search Report dated Dec. 15, 2022, mailed in counterpart European Application No. 22188396.0, 6 pages.

* cited by examiner

*Primary Examiner* — Hee K Song
(74) *Attorney, Agent, or Firm* — Kim & Stewart LLP (57) ABSTRACT

According to one embodiment, a service management system includes a relay device to relay communications between a client and a server providing a service that comprises one or more microservices. The relay device generates an authentication token, authenticates the authentication token when included in a service request from the client, and issues a command to the server to execute a service requested by the client after the authentication token is successfully authenticated. A token issuing server is provided to communicate with the relay device and the client and includes a storage unit and a processor. The processor is configured to store an access key issued by the relay device in the storage unit, acquire the authentication token from the relay device by using the access key, and send the acquired authentication token to the client in response to a token request from the client.

20 Claims, 7 Drawing Sheets

SERVICE MANAGEMENT SYSTEM, TOKEN ISSUING SERVER, AND METHOD FOR TOKEN ISSUING SERVER

CROSS-REFERENCE TO RELATED APPLICATION

This application is based upon and claims the benefit of priority from Japanese Patent Application No. 2021-203285, filed Dec. 15, 2021, the entire contents of which are incorporated herein by reference.

FIELD

Embodiments described herein relate generally to a service management system, a token issuing server, and a method for such systems and servers.

BACKGROUND

In a communication system, an application programming interface (API) gateway may be employed as a relay device for relaying communications between a client and a server that provides various services in response to a request from the client. In such a communication system, as the number of clients increases, the load on the API gateway increases, possibly degrading its performance as a relay device.

DETAILED DESCRIPTION

Certain example embodiments described herein provide a service management system, a token issuing server, and a program or method that can prevent performance degradation of a relay device for communications between a client and a server.

In general, according to one embodiment, a service management system includes a relay device to relay communications between a client device and a server providing a service that comprises one or more microservices. The relay device is configured to generate an authentication token for the client device, authenticate the authentication token when included in a service request from the client device, and issue a command to the server to execute a service requested by the client device if the authentication token is successfully authenticated. A token issuing server is provided to communicate with the relay device and the client device. The token issuing server includes a storage unit and a processor. The processor is configured to store an access key issued by the relay device in the storage unit, acquire the authentication token for the client device from the relay device by using the access key stored in the storage unit, and send the acquired authentication token to the client device in response to a token request from the client device.

In general, according to at least one other embodiment, a service management system includes a relay device configured to relay communications between a client and a server providing a service ("a service providing server") including one or more microservices. The system further includes a token issuing server configured to communicate with the relay device and the client. The token issuing server includes an access key storage unit, a token acquisition unit, and a token issuing unit. The access key storage unit stores an access key issued by the relay device. The token acquisition unit acquires an authentication token from the relay device, using the access key stored in the access key storage unit. The token issuing unit issues the authentication token acquired by the token acquisition unit to the client in response to a token request from the client. The relay device includes an access key generation unit, a token generation unit, a token authentication unit, and a service processing unit. The access key generation unit generates an access key for access to the relay device. The token generation unit generates the authentication token. The token authentication unit authenticates the authentication token included in a service request from the client. The service processing unit relays the service request from the client to the service providing server to execute a service requested by the client, if the authentication token is successfully authenticated by the token authentication unit.

Hereinafter, certain example embodiments will be described with reference to the accompanying drawings.

In an example embodiment, the communication system employs an API gateway for handling communication between a client and a service providing server.

Communication System

Figure 1:
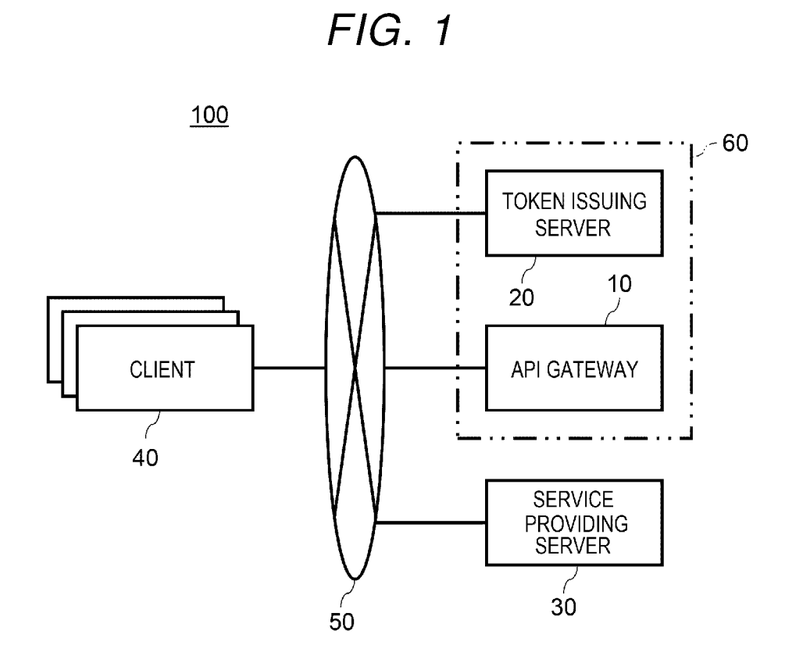
FIG. 1 depicts a communication system according to an embodiment.

FIG. 1 is a schematic view showing a configuration of a communication system 100. The communication system 100 includes a server 30 ("service providing server") and a plurality of clients 40. The communication system 100 includes an API gateway 10, a token issuing server 20, the server 30, and the clients 40. These components of communication system 100 are each to a communication network 50. The communication network 50 may be the internet in some examples. In other examples, the communication network may be an intranet or the like formed by applying technologies of the internet. The communication network 50 may be a combination of the internet and/or the intranet with a local area network (LAN). The LAN may be a wired LAN or a wireless LAN.

The server 30 is a computer providing various services in response to a request from a client 40. Typically, the server 30 might be implemented as a cloud computing server or cloud-based sever.

Each of the clients 40 is a computer that can use a service provided by or from the server 30. For example, a general-purpose electronic device, such as a personal computer, a tablet terminal or a smartphone, can be used as a client 40. If the server 30 provides various services related to a point of sales (POS) application, the client 40 may incorporate or be a device such as a scanner, a display, a keyboard or a credit card reader or may be computer connected to such devices to provide functions of a POS terminal or the like.

The API gateway 10 functions as a relay device that relays communications between the server 30 and the clients 40. The token issuing server 20 communicates with the API gateway 10 and the respective clients 40 via the communication network 50. The API gateway 10 and the token issuing server 20 are communicably connected to each other via the communication network 50 form a service management system 60.

Service Providing Server

Figure 2:
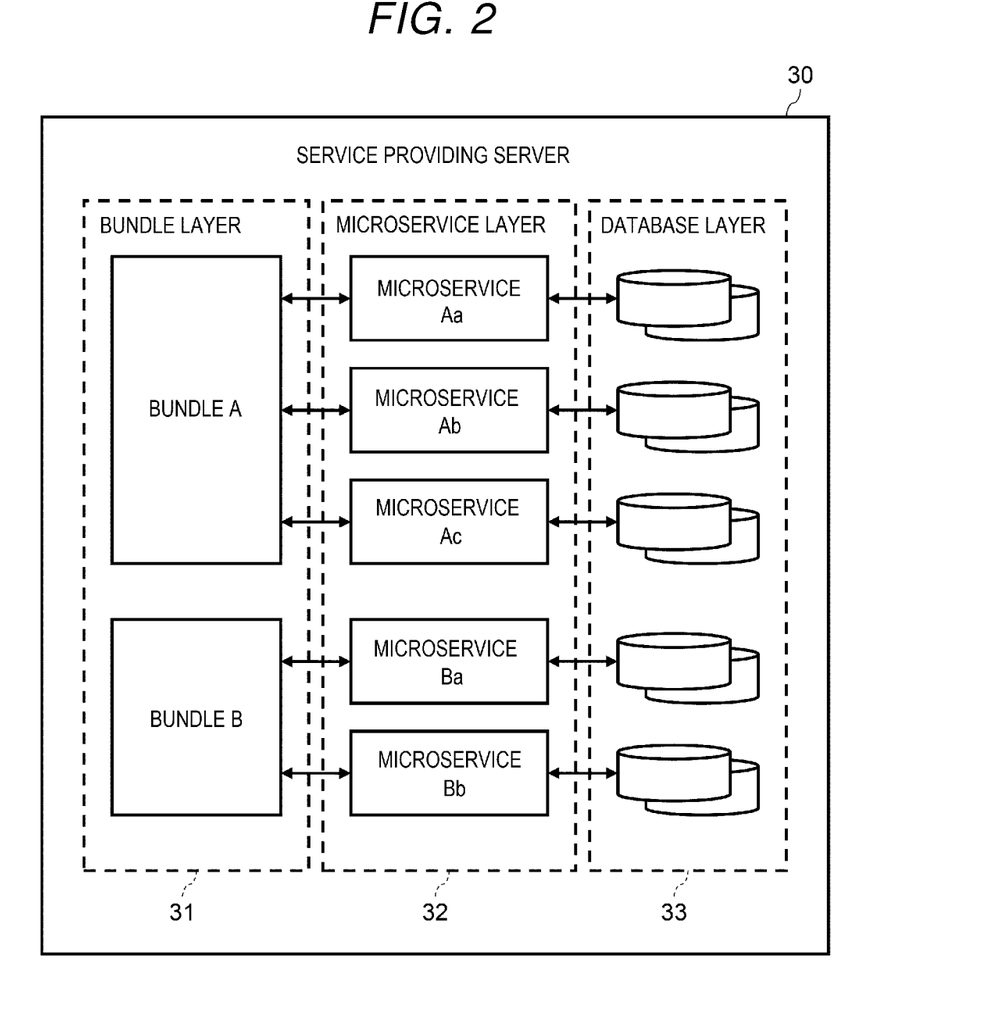
FIG. 2 depicts aspects of a service providing server according to an embodiment.

As shown in FIG. 2, the server 30 includes a bundle layer 31, a microservice layer 32, and a database layer 33.

The bundle layer 31 is an aggregate of bundles. The bundles are prepared for every type of service that can be requested from the clients 40. Each bundle is an architecture linking two or more microservices together to provide a specific service requested from the clients 40. In some examples, a bundle may be an architecture that provides just one microservice as a service requested from the client 40 rather than a combination of microservices.

The microservice layer 32 is an aggregate of the microservices. A microservice is an application that causes one service to operate as one process. The microservice processes one service, by referring to one or more databases. In some examples, a microservice may process a service without referring to any database.

The database layer 33 is an aggregate of databases. Each database is an aggregate of data to which the microservices refer to when in operation. A database may be provided for every type of data. In some examples, a database may be shared (referred to) by multiple microservices.

If the server 30 provides various services related to a POS application as in the present example, the bundles in the bundle layer 31 may include a bundle A corresponding to a merchandise registration request, a bundle B corresponding to a transaction settlement request, and the like.

The bundle A links together a microservice Aa for analyzing a barcode by reference to a barcode conversion parameter database, a microservice Ab for acquiring merchandise data, such as merchandise name and unit price, by reference to a merchandise master database based on a merchandise code acquired by the barcode analysis, and a microservice Ac for registering merchandise sales data in a transaction file database.

The bundle B links together a microservice Ba for acquiring, from a transaction file database, data about a transaction for which a settlement request has been made, and a microservice Bb for executing payment processing based on the acquired transaction data and registering sales data to a sales file database, and provides a service corresponding to the transaction settlement request to the client 40.

API Gateway

Figure 3:
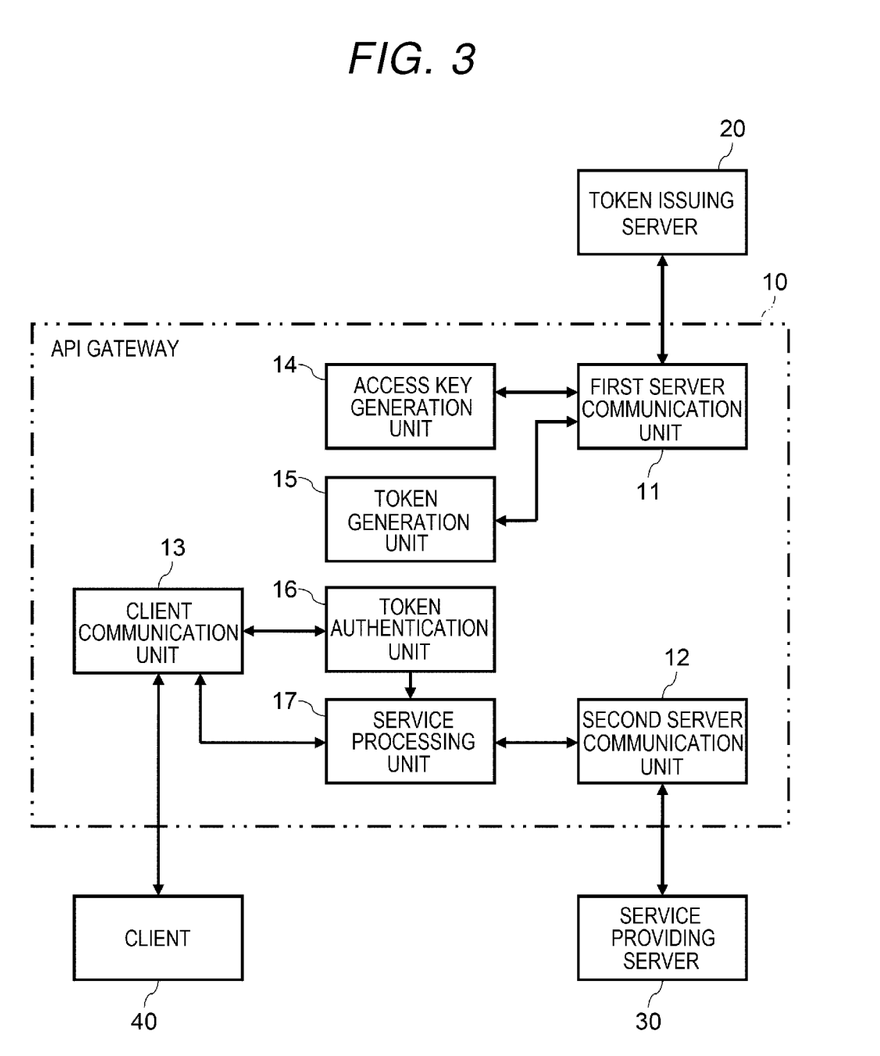
FIG. 3 is a block diagram of an API gateway according to an embodiment.

As shown in FIG. 3, the API gateway 10 functions as or includes a first server communication unit 11, a second server communication unit 12, a client communication unit 13, an access key generation unit 14, a token generation unit 15, a token authentication unit 16, and a service processing unit 17. These units may be implemented by software or hardware or by a combination of software and hardware.

The first server communication unit 11 performs data communication with the token issuing server 20 via the communication network 50 (see FIG. 1). The second server communication unit 12 performs data communication with the service providing server 30 via the communication network 50. The client communication unit 13 performs data communication with the client 40 via the communication network 50.

The access key generation unit 14 generates an access key that is an authentication key to access the API gateway 10. The access key may also be referred to as a consumer key or the like. In the present embodiment, the access key is used by the token issuing server 20 to access the API gateway 10, for example. The token generation unit 15 generates an authentication token. The authentication token may be, for example, valid for a limited period of time, such as 10 minutes, 20 minutes, or 30 minutes or any appropriate period of time. The token authentication unit 16 authenticates the authentication token attached to a service request from the client 40. The service processing unit 17 executes processing of outputting the service request for which the authentication token is successfully authenticated to the service providing server 30 and outputting a result response to the service request to the client 40 that is the service request source.

Token Issuing Server

Figure 4:
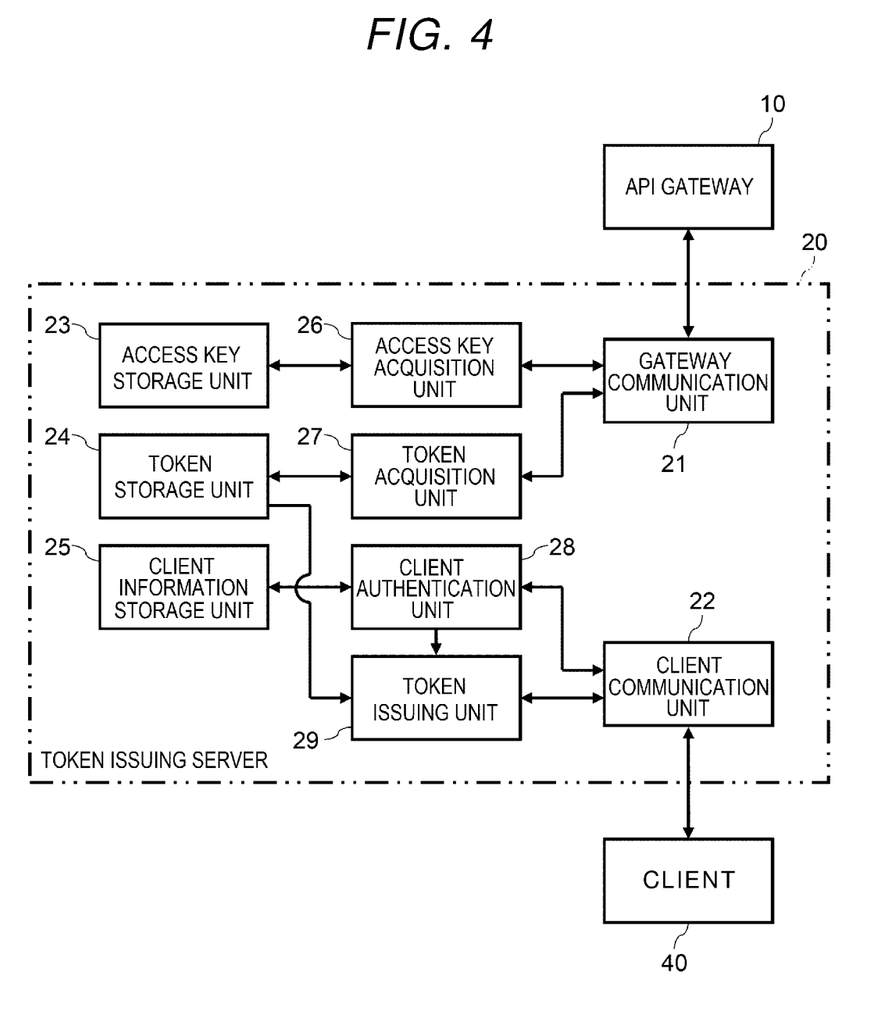
FIG. 4 is a block diagram of a token issuing server according to an embodiment.

As shown in FIG. 4, the token issuing server 20 functions as or includes a gateway communication unit 21, a client communication unit 22, an access key storage unit 23, a token storage unit 24, a client information storage unit 25, an access key acquisition unit 26, a token acquisition unit 27, a client authentication unit 28, and a token issuing unit 29. These units may be implemented by software or hardware or by a combination of software and hardware.

The gateway communication unit 21 performs data communication with the API gateway 10 via the communication network 50 (see FIG. 1). The gateway communication unit 21 functions as a first communication unit. The client communication unit 22 performs data communication with the client 40 via the communication network 50. The client communication unit 22 functions as a second communication unit.

The access key storage unit 23 stores an access key. The token storage unit 24 stores an authentication token. The client information storage unit 25 stores a unique identification (ID) correlated with a password for every one of the clients 40.

The access key acquisition unit 26 acquires an access key generated by the API gateway 10 and writes the acquired access key into the access key storage unit 23. The token acquisition unit 27 acquires an authentication token generated by the API gateway 10 and writes the acquired authentication token into the token storage unit 24. The client authentication unit 28 compares the ID and the password received from the client 40 with the information stored in the client information storage unit 25 and thus can authenticate a client 40. The client authentication unit 28 issues the authentication token (stored in the token storage unit 24) to the successfully authenticated client 40.

Figure 5:
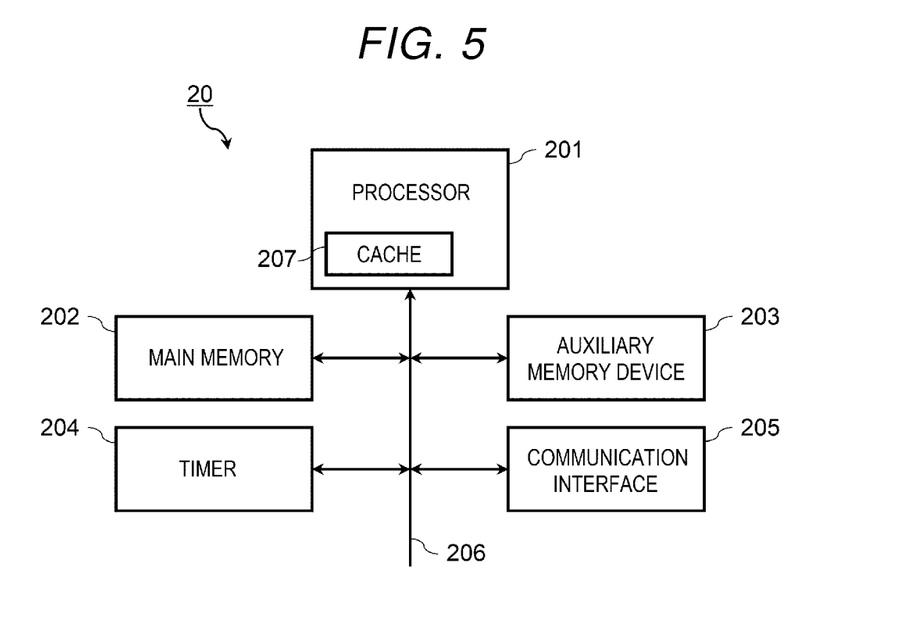
FIG. 5 is a block diagram of a configuration of a token issuing server according to an embodiment.

FIG. 5 is a block diagram of the token issuing server 20. The token issuing server 20 includes a processor 201, a main memory 202, an auxiliary memory device 203, a timer 204, and a communication interface 205. The processor 201, the main memory 202, the auxiliary memory device 203, the timer 204, and the communication interface 205 are communicably connected to each other via a system bus 206. The system bus 206 comprises an address bus, a data bus or the like.

The processor 201 controls the various parts, units, elements, or the like of the token issuing server 20 to implement various functions of the token issuing server 20 according to an operating system or an application program. The processor 201 has a cache memory 207 inside. The processor 201 is a central processing unit (CPU), for example.

The main memory 202 includes a non-volatile memory area and a volatile memory area. The main memory 202 stores the operating system or the application program in the non-volatile memory area. The main memory 202 stores data in the volatile memory area to be used by the processor 201 in executing processing and control. That is, in the main memory 202, the volatile memory area can be used as a work area where data written and rewritten by the processor 201 when appropriate. The non-volatile memory area is a read-only memory (ROM), for example. The volatile memory area is a random-access memory (RAM), for example.

As the auxiliary memory device 203, for example, an electrically erasable programmable read-only memory (EEPROM), a hard disk drive (HDD), a solid-state drive (SSD) or the like may be used. A combination of such memory devices may be used. The auxiliary memory device 203 stores data used by the processor 201 to execute various kinds of processing, data generated by the processing by the processor 201, and the like. The auxiliary memory device 203 may also store an application program.

The main memory 202 and the auxiliary memory device 203 may each be built-in memory of the token issuing server 20. In some examples, the auxiliary memory device 203 may be or include a memory device externally attached to the token issuing server 20.

The application program(s) stored in the main memory 202 or the auxiliary memory device 203 may be referred to as a control program in some contexts. The method for installing a control program in the main memory 202 or the auxiliary memory device 203 is not particularly limited. Such a control program can be recorded in a removable recording medium or distributed via a network for installation in the main memory 202 or the auxiliary memory device 203. The recording medium may be any format that can store a program and be readable by the token issuing server 20, such as a CD-ROM or a memory card.

The timer 204 tracks the time for the processor 201. The timer 204 outputs a timeout signal to the processor 201 when the tracked time reaches a set time limit or the like.

The communication interface 205 connects to the communication network 50. The token issuing server 20 communicates, via the communication interface 205, with the API gateway 10 and the clients 40 connected to the communication network 50. The communication interface 205 can be or incorporate a piece hardware that provides functions of the gateway communication unit 21 and the client communication unit 22.

The token issuing server 20 uses a part of the memory area of the main memory 202 or the auxiliary memory device 203 as the access key storage unit 23 and the client information storage unit 25. The main memory 202 or the auxiliary memory device 203 provide the functions of the access key storage unit 23 and the client information storage unit 25.

The token issuing server 20 uses a part of the memory area of the cache memory 207 as the token storage unit 24. That is, the cache memory 207 provides the functions of the token storage unit 24.

By the processor 201 executing information processing according to a control program, the token issuing server 20 provides the overall functions of the access key acquisition unit 26, the token acquisition unit 27, the client authentication unit 28, and the token issuing unit 29. That is, the processor 201 is hardware for implementing the described functions of the access key acquisition unit 26, the token acquisition unit 27, the client authentication unit 28, and the token issuing unit 29.

Service Management System

Figure 6:
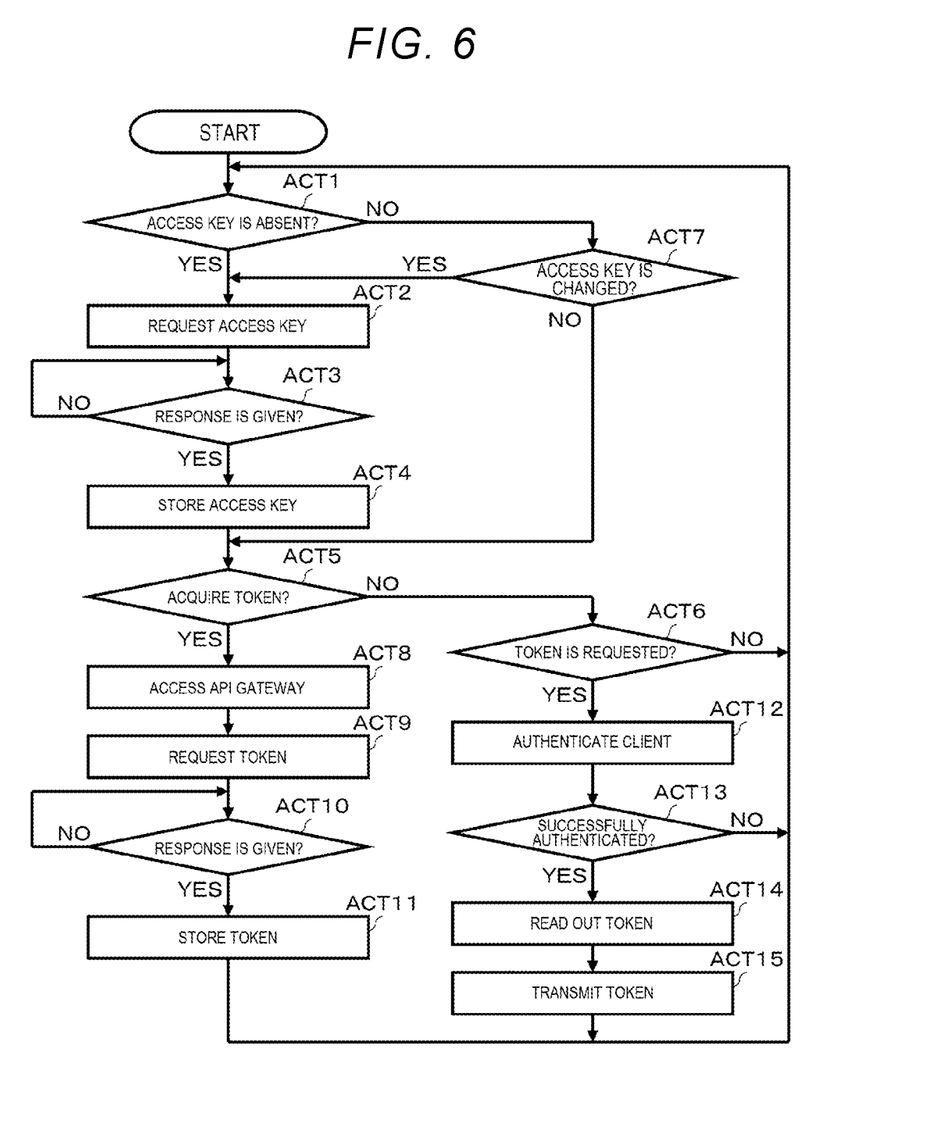
FIG. 6 is a flowchart of information processing executed by a token issuing server according to an embodiment.
Figure 7:
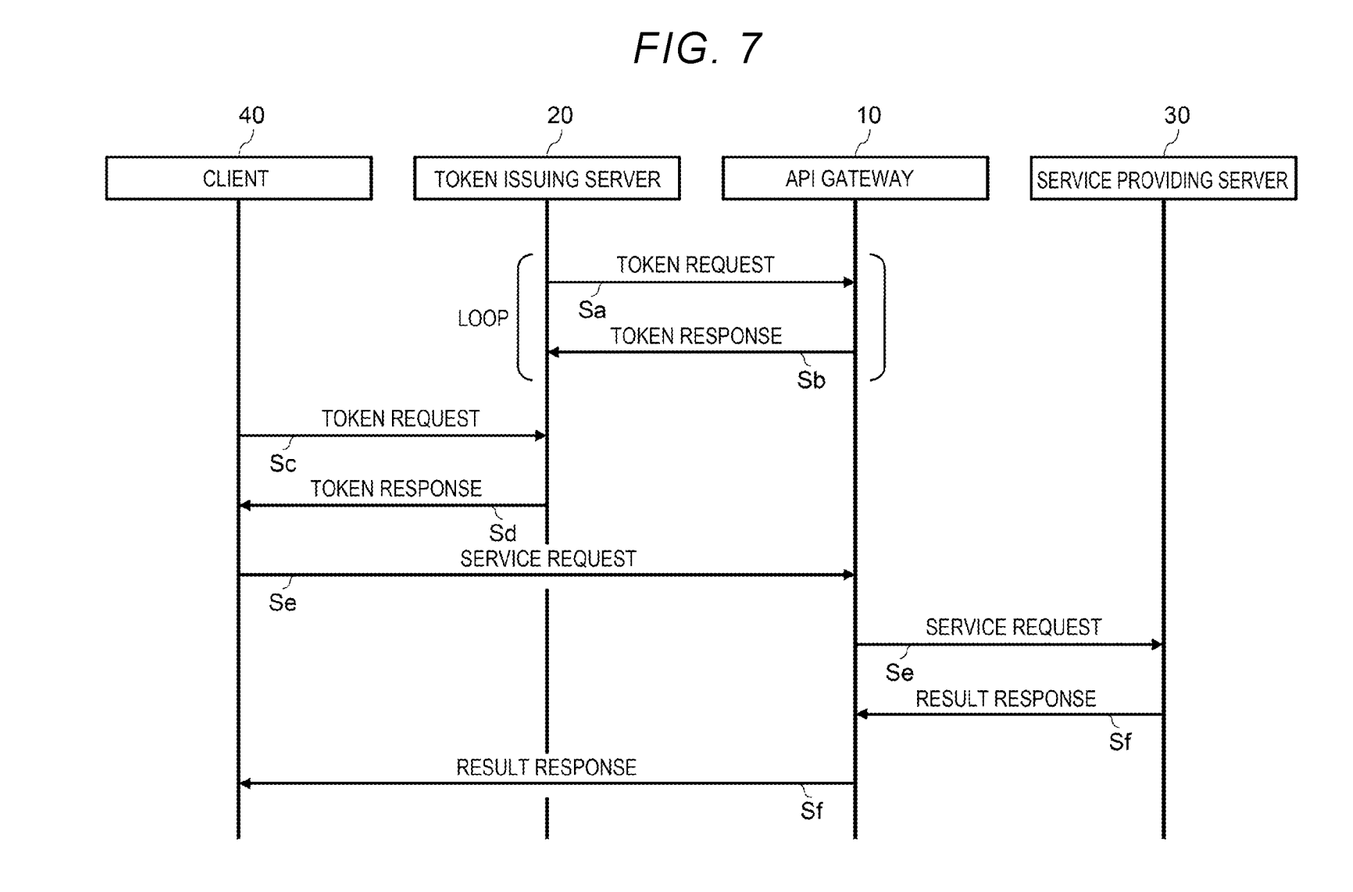
FIG. 7 is a sequence chart of data signals communicated among a token issuing server, an API gateway, a service providing server, and a client according to an embodiment.

FIG. 6 is a flowchart of information processing executed by the processor 201 in the token issuing server 20 according to a control program. FIG. 7 is a sequence chart reflecting signals transmitted between the token issuing server 20, the API gateway 10, the service providing server 30, and a client 40 in connection with the information processing of the token issuing server 20. The information processing is not limited to that of the present example and various procedures and aspects thereof may be suitably changed while still obtaining similarly advantageous effects.

In ACT 1, the processor 201 checks whether an access key is stored in the access key storage unit 23 or not. If an access key is not stored (that is, the access key is absent, "YES," in ACT 1), the processor 201 proceeds to ACT 2. In ACT 2, the processor 201 (functioning as an access key acquisition unit 26) makes a request to the API gateway 10 to provide an access key. Specifically, the processor 201 transmits a command signal for requesting an access key to the API gateway 10 with the gateway communication unit 21.

Upon receiving this command signal, the API gateway 10 transmits a response signal including an access key (as generated by the access key generation unit 14) to the token issuing server 20 via the first server communication unit 11.

The processor 201 waits for the response signal in ACT 3. Upon receiving the response signal via the gateway communication unit 21 (YES in ACT 3), the processor 201 proceeds to ACT 4.

In ACT 4, the processor 201 (functioning as an access key acquisition unit 26) overwrites the data in the access key storage unit 23 with the access key provided by the response signal and thus stores the new access key in the access key storage unit 23. The processor 201 then proceeds to ACT 5.

In ACT 5, the processor 201 checks whether it is time to acquire an authentication token (an authentication token acquisition timing). If there is no authentication token presently stored in the token storage unit 24, the processor 201 determines that it is an authentication token acquisition time (YES in ACT 5). If there is already an authentication token stored in the token storage unit 24 but the period of time during which the authentication token is valid has expired, the processor 201 also determines that it is an authentication token acquisition time (YES in ACT 5). Such validity time period for authentication token can be tracked by the timer 204.

If it is not an authentication token acquisition time (NO in ACT 5), the processor 201 proceeds to ACT 6. In ACT 6, the processor 201 checks whether an acquisition request for an authentication token has been made by the client 40.

For the client 40 to use a service provided by the service providing server 30, the client 40 needs to acquire an authentication token. The client 40 that needs an authentication token transmits a command signal Sc (see FIG. 7) for requesting an authentication token to the token issuing server 20.

If no acquisition request for an authentication token has been made by any client 40 (NO in ACT 6), the processor 201 returns to ACT 1. In ACT 1, the processor 201 checks again whether there is an access key stored in the access key storage unit 23 or not. At this point, if an access key has already been stored in the access key storage unit 23 (access key is already present/stored, so "NO" in ACT 1), the processor 201 proceeds to ACT 7. In ACT 7, the processor 201 checks whether the access key generated by the API gateway 10 has been changed or not.

The API gateway 10 holds/stores the access keys generated by the access key generation unit 14. However, for various reasons, the access key may disappear, be overwritten, become corrupted, or the like. When the access key disappears or the like in this manner, the API gateway 10 generates a new access key with the access key generation unit 14 (YES in ACT 7). Since the access key generation unit 14 randomly generates access keys, the newly generated access key will not coincide with the previous access key that disappeared (or the like). That is, the access key for the token issuing server 20 has been changed from its previous iteration/version.

If there is no change of the access key (NO in ACT 7), the processor 201 proceeds to ACT 5. In ACT 5, the processor 201 checks whether it is an authentication token acquisition time. If it is not an authentication token acquisition time (NO in ACT 5), the processor 201 determines whether an acquisition request for an authentication token has been made by the client 40 (ACT 6).

In this way, so long as the access key stored in the access key storage unit 23 has not been changed, the processor 201 waits for an authentication token acquisition time in ACT 5 or alternatively waits to receive an acquisition request from the client 40 in ACT 6.

If it is an authentication token acquisition time in ACT 5 (YES in ACT 5), the processor 201 proceeds to ACT 8. In ACT 8, the processor 201 accesses the API gateway 10 using the access key stored in the access key storage unit 23. Then, in ACT 9, the processor 201 (functioning as the token acquisition unit 27) requests the API gateway 10 to provide a token. Specifically, the processor 201 transmits a command signal Sa (see FIG. 7) for requesting a token to the API gateway 10 from the gateway communication unit 21.

Upon receipt of the command signal Sa, the API gateway 10 transmits a response signal Sb (see FIG. 7) including the authentication token (as generated by the token generation unit 15) to the token issuing server 20 via the first server communication unit 11.

In ACT 10, the processor 201 waits for the response signal Sb from the API gateway 10. Upon receiving the response signal Sb (YES in ACT 10), the processor 201 proceeds to ACT 11. In ACT 11, the processor 201 (functioning as the token acquisition unit 27) overwrites the data in the token storage unit 24 with the new authentication token included in the response signal Sb and thus stores the authentication token in the token storage unit 24. The processor 201 then returns to ACT 1.

If the access key was not changed (NO in ACT 7), the processor 201 waits for an authentication token acquisition time to come or alternatively waits to receive an acquisition request for an authentication token (token acquisition request) from the client 40. If an authentication token acquisition time is reached in this waiting state (YES in ACT 5), the processor 201 executes the processing of ACTs 8 to 11 again.

Accordingly, the command signal Sa requesting a token is periodically transmitted from the token issuing server 20 to the API gateway 10 as shown by the "LOOP" notation in FIG. 7. In response to the command signal Sa, the response signal Sb (including the authentication token as of the most recent time) is returned from the API gateway 10 to the token issuing server 20. Thus, the token issuing server 20 constantly stores the latest (most recent) authentication token generated by the API gateway 10 for each client 40.

Upon receipt of the command signal Sc (see FIG. 7) requesting an authentication token via the client communication unit 22 from the client 40 in ACT 6 (YES in ACT 6), the processor 201 proceeds to ACT 12. In ACT 12, the processor 201 (functioning as the client authentication unit 28) authenticates the client 40 that sent the command signal Sc. Specifically, the command signal Sc includes an ID and a password that are set for the requesting client 40. The processor 201 checks whether the combination of the ID and the password has been stored in the client information storage unit 25 or not. If information that coincides with the combination of the ID and the password included in the command signal Sc is stored in the client information storage unit 25, the client 40 is successfully authenticated.

In ACT 13, the processor 201 checks whether the client 40 is successfully authenticated. If the client 40 is not successfully authenticated (NO in ACT 13), the processor 201 disables or otherwise ignores the command signal Sc from the unauthenticated client 40 and returns to ACT 1.

If the client 40 is successfully authenticated (YES in ACT 13), the processor 201 proceeds to ACT 14. In ACT 14, the processor 201 (functioning as token issuing unit 29) reads out the authentication token stored in the token storage unit 24.

In ACT 15, the processor 201 (functioning as token issuing unit 29) performs control to transmit the authentication token to the client 40 that sent the command signal Sc. By this control, a response signal Sd (see FIG. 7) including the authentication token is transmitted from the client communication unit 22 to the corresponding client 40. After sending (transmitting) the authentication token, the processor 201 returns to ACT 1. If the access key has not been changed (NO in ACT 7), the processor 201 waits for an authentication token acquisition time to come or alternatively waits to receive an acquisition request for an authentication token from a client 40. If the processor 201 receives an acquisition request for an authentication token from any client 40 while in this waiting state (YES in ACT 6), the processor 201 executes the processing of ACTs 12 to 15 again.

Accordingly, the client 40, which has transmitted the command signal Sc for requesting an authentication token, receives the response signal Sd (including the most recent authentication token) from the token issuing server 20. The client 40, which has received the response signal Sd, can then transmit a command signal Se (see FIG. 7) requesting a desired service to the API gateway 10. The command signal Se includes the authentication token as acquired from the token issuing server 20.

Upon receipt of the command signal Se via the client communication unit 13 from the client 40, the API gateway 10 (functioning as the token authentication unit 16) authenticates the authentication token included in the command signal Se. If the authentication token coincides with the authentication token that was generated by the token generation unit 15 for the client 40 and stored in the API gateway 10, the API gateway 10 determines that the authentication is successful. If the authentication token included in the command signal Se does not coincide with the authentication token held in the API gateway 10, the API gateway 10 determines that the authentication is unsuccessful.

If the authentication of the authentication token is successful, the API gateway 10 (functioning as the service processing unit 17) relays the command signal Se received from the client 40 to the service providing server 30 via the second server communication unit 12 (see FIG. 3). The service providing server 30 executes the service requested by the command signal Se and transmits a response signal Sf (see FIG. 7) representing the result of the execution of the service to the API gateway 10. The API gateway 10 (functioning as the service processing unit 17) relays the response signal Sf (representing the result of the execution of the service) to the client 40. Thus, the client 40 can use the service provided by the service providing server 30.

Effects

In an embodiment, a service management system 60 not only includes the API gateway 10 that functions as a relay device for relaying communications between a client 40 and a service providing server 30 but also includes a token issuing server 20.

The token issuing server 20 acquires an access key generated by the API gateway 10 and stores the access key in its access key storage unit 23. The token issuing server 20 periodically accesses the API gateway 10 using the access key stored in the access key storage unit 23, then acquires an authentication token that has been generated by the API gateway 10 (and updated as needed over time), and stores the acquired authentication token in the token storage unit 24.

The token issuing server 20 accepts an acquisition request for an authentication token from each client 40. The token issuing server 20 then issues the authentication token stored in the token storage unit 24 to the client 40 requesting the acquisition. The client 40 with the issued authentication token can then access the API gateway 10 using this authentication token to request a service. The authentication token issued by the token issuing server 20 is the latest, most recent authentication token corresponding to the client 40. Therefore, the authentication of the authentication token at the API gateway 10 will be successful. Thus, a request for a service can be made to the service providing server 30 via the API gateway 10, and the client 40 is then notified of the result of the execution of the service.

In an embodiment, the token issuing server 20 stores an access key generated by the API gateway 10.

In a communication system of a comparative example lacking the token issuing server 20, each client 40 needs to separately store its access key for interacting with the API gateway 10, but in such a system the client 40 has no ability to check whether its access key has been changed, updated or the like by the API gateway 10 and thus may require a new authentication process. Also, due to security concerns, in such a communication system, it may be difficult to identify the client 40 using an external server or the like, and even if the client identification is possible, it may also be difficult to just update the access key of the identified client 40. Therefore, the access key stored in the client 40 cannot be modified easily. Thus, if the access key held by the API gateway 10 is lost (disappeared) for some reason and a new access key has already been generated for the client 40, the client 40 cannot yet know the new access key and thus will be unable to securely communicate with the API gateway 10. That is, when the client 40 tries to access the API gateway 10 using the old access key, the access will be rejected.

In contrast, in an embodiment, the client 40 does not need to store the access key on its own for accessing the API gateway 10. But rather the client 40 can acquire the latest authentication token from the token issuing server 20 without using the API gateway 10 access key. Therefore, rejection of the access by the client 40 to the API gateway 10 due to rewriting of the access key held by the API gateway 10 does not occur.

In an embodiment, the token issuing server 20 periodically accesses the API gateway 10 using its own access key and acquires (and then stores) the latest authentication token from the API gateway 10. Each client 40 can access the token issuing server 20 instead of the API gateway 10 to acquire the latest authentication token. In this way, since the token issuing server 20 is provided in the service management system 60, certain types of access from the individual clients 40 are split between the token issuing server 20 and the API gateway 10. As a result, even if the number of clients 40 increases significantly, performance degradation of the API gateway 10 as a relay device due to an increase in the load on the API gateway 10 can be avoided or mitigated. In other words, the service management system 60 incorporating both the token issuing server 20 and the API gateway 10 can cope with an increase in the total number of clients 40.

Also, in an embodiment, an ID and a password are set on a per client 40 basis, and the token issuing server 20 stores the information of the ID and the password. When an authentication token is requested by the client 40, the token issuing server 20 handles the determination of the validity of the client 40 based on the ID and the password sent from the client 40 along with the authentication token request. Therefore, inconveniences, such as issuance of any authentication token to an abnormal client 40 whose validity is not approved, can be prevented, and the reliability of the communication system 100 is not impaired.

Modification Examples

In an embodiment, a part of the memory area of the cache memory 207 is used for the token storage unit 24. In a modified embodiment, a part of the memory area of the main memory 202 or the auxiliary memory device 203 may be used for the token storage unit 24.

In an embodiment, an ID and a password are used as an example of the information used for authenticating the validity of a client 40. However, the information for authenticating the validity of a client 40 is not limited to IDs and passwords. For example, the token issuing server 20 may authenticate the validity, based only on an ID supplied by the client 40.

While certain embodiments have been described, these embodiments are presented by way of example only and are not intended to limit the spirit and scope of the disclosure. These novel embodiments can be carried out in various other forms, and various modifications such as omissions, substitutions, replacements and changes can be made without departing from the spirit and scope of the disclosure. The accompanying claims and equivalents thereof are intended to cover such forms and modifications as would fall within the spirit and scope of the disclosure.

What is claimed is:

1. A service management system, comprising:
 a relay device to relay communications between a client device and a server providing a service that comprises one or more microservices, the relay device configured to:
  generate an authentication token,
  authenticate the authentication token when included in a service request from the client device, and
  issue a command to the server to execute a service requested by the client device if the authentication token is successfully authenticated; and
 a token issuing server to communicate with the relay device and the client device, the token issuing server including:
  a storage unit, and
  a processor configured to:
   store an access key issued by the relay device in the storage unit;
   acquire the authentication token for the client device from the relay device by using the access key stored in the storage unit; and
   send the acquired authentication token to the client device in response to a token request from the client device.

2. The service management system according to claim 1, wherein the relay device is an API gateway.

3. The service management system according to claim 1, wherein the processor of the token issuing server is further configured to store the acquired authentication token for the client device in the storage unit.

4. The service management system according to claim 1, wherein the processor of the token issuing server is further configured to periodically acquire the authentication token for the client device from the relay device.

5. The service management system according to claim 1, wherein the relay device is configured to periodically change the authentication token for the client device.

6. The service management system according to claim 1, wherein the token issuing server includes a timer configured to track a validity period for the authentication token.

7. The service management system according to claim 1, wherein the processor of the token issuing server is further configured to perform an authentication process for the client device based on at least one of a password and an ID provided by the client device as part of a token request sent to the token issuing server.

8. The service management system according to claim 1, wherein the token issuing server further comprises:
   a first communication unit configured to communicate with the relay device; and
   a second communication unit configured to communicate with the client device.

9. A token issuing server for a service management system, the token issuing server comprising:
   a first communication unit configured to connect to a relay device communicating with a server providing a service to a client device, the service including one or more microservices;
   a second communication unit configured to connect to the client device;
   a storage unit a storage unit; and
   a processor configured to:
      store an access key issued by the relay device in the storage unit;
      acquire the authentication token for the client device from the relay device by using the access key stored in the storage unit; and
      send the acquired authentication token to the client device in response to a token request from the client.

10. The token issuing server according to claim 9, wherein the relay device is an API gateway.

11. The token issuing server according to claim 9, wherein the processor is further configured to store the acquired authentication token for the client device in the storage unit.

12. The token issuing server according to claim 9, wherein the processor is further configured to periodically acquire the authentication token for the client device from the relay device.

13. The token issuing server according to claim 9, wherein the relay device is configured to periodically change the authentication token for the client device.

14. The token issuing server according to claim 9, wherein the token issuing server includes a timer configured to track a validity period for the authentication token.

15. The token issuing server according to claim 9, wherein the processor is further configured to perform an authentication process for the client device based on at least one of a password and an ID provided by the client device as part of a token request.

16. A method for a service management system, the method comprising:
   storing an access key issued by a relay device in a storage unit of a token issuing server;
   acquiring, with the token issuing server, an authentication token from the relay device using the access key stored in the storage unit; and
   sending the acquired authentication token to a client device from the token issuing server in response to a token request from the client device.

17. The method according to claim 16, wherein the relay device is an API gateway.

18. The method according to claim 16, wherein the relay device handles service requests from the client device for services provided by a service providing server, wherein the services provided by the service providing server comprise one or more microservices.

19. The method according to claim 16, further comprising:
   storing the acquired authentication token for the client device in the storage unit.

20. The method according to claim 16, further comprising:
   periodically acquiring the authentication token for the client device from the relay device.

* * * * *